US008788107B2

(12) United States Patent
Yasugi

(10) Patent No.: US 8,788,107 B2
(45) Date of Patent: Jul. 22, 2014

(54) WIND TURBINE GENERATOR FOR USE IN COLD WEATHER, METHOD OF CONTROLLING THE SAME, AND WIND TURBINE GENERATING SYSTEM FOR USE IN COLD WEATHER

(75) Inventor: Akira Yasugi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1178 days.

(21) Appl. No.: 12/601,359

(22) PCT Filed: Jun. 5, 2009

(86) PCT No.: PCT/JP2009/060322
§ 371 (c)(1),
(2), (4) Date: Nov. 23, 2009

(87) PCT Pub. No.: WO2010/140248
PCT Pub. Date: Dec. 9, 2010

(65) Prior Publication Data
US 2011/0077787 A1    Mar. 31, 2011

(51) Int. Cl.
*G05D 17/00* (2006.01)
*H02P 9/00* (2006.01)

(52) U.S. Cl.
USPC ............. 700/287; 700/299; 322/33; 318/473

(58) Field of Classification Search
USPC ................. 700/22, 286–299; 322/10–12, 17, 322/22–25, 33, 35; 318/445, 452–455, 318/471–473; 320/101, 102
See application file for complete search history.

(56) References Cited

U.S. PATENT DOCUMENTS 7,345,373 B2 * 3/2008 Delmerico et al. ............. 290/44
7,622,816 B2 * 11/2009 Stahlkopf ........................ 290/44
(Continued)

FOREIGN PATENT DOCUMENTS

| JP | 2003288832 | 10/2003 |
| JP | 2004297892 | 10/2004 |

(Continued)

OTHER PUBLICATIONS

Taiwanese Notice of Allowance issued Jun. 26, 2012, for Taiwan Patent Application No. 098120454—TW Language Version.

(Continued)

*Primary Examiner* — M. N. Von Buhr
(74) *Attorney, Agent, or Firm* — Manabu Kanesaka; Benjamin J. Hauptman

(57) ABSTRACT

Damage is prevented on electric devices in a case where a generator is installed in a cold weather. A wind turbine generator includes a power supply unit connected to a utility grid via a switch gear; a utility grid voltage measuring unit provided between the power supply unit and the utility grid, for measuring a voltage of the utility grid; and a temperature measuring unit for obtaining an ambient temperature of the power supply unit. In a case where a measurement value of the temperature measuring unit or an ambient temperature of the power supply unit estimated based on the measurement value is smaller than a first temperature threshold determined based on a function guarantee temperature of the power supply unit and the voltage measured by the utility grid voltage measuring unit is smaller than a preset voltage threshold, the switch gear operates to interrupt the connection between the power supply unit and the utility grid.

7 Claims, 5 Drawing Sheets

(56) References Cited

U.S. PATENT DOCUMENTS

| | | | |
|---|---|---|---|
| 7,714,457 B2 * | 5/2010 | Sankrithi | 290/44 |
| 7,787,266 B2 * | 8/2010 | Janssen et al. | 363/37 |
| 7,791,223 B2 * | 9/2010 | Gonzalez et al. | 307/103 |
| 7,839,024 B2 * | 11/2010 | Cardinal et al. | 307/84 |
| 7,855,467 B2 * | 12/2010 | Kawazoe et al. | 290/44 |
| 7,944,068 B2 * | 5/2011 | Wagoner et al. | 290/44 |
| 8,041,466 B2 * | 10/2011 | Helle et al. | 700/287 |
| 8,120,932 B2 * | 2/2012 | Folts et al. | 363/37 |
| 8,312,733 B2 * | 11/2012 | Tsarev et al. | 62/238.3 |
| 2007/0124025 A1 * | 5/2007 | Schram et al. | 700/287 |
| 2008/0112807 A1 * | 5/2008 | Uphues et al. | 416/1 |
| 2008/0150282 A1 | 6/2008 | Rebsdorf et al. | |
| 2008/0195255 A1 * | 8/2008 | Lutze et al. | 700/291 |
| 2009/0021963 A1 * | 1/2009 | Andresen et al. | 363/37 |
| 2010/0060000 A1 * | 3/2010 | Scholte-Wassink | 290/44 |
| 2010/0198420 A1 * | 8/2010 | Rettger et al. | 700/291 |
| 2010/0270798 A1 * | 10/2010 | Poulsen et al. | 290/44 |
| 2010/0274400 A1 * | 10/2010 | Ormel et al. | 700/287 |
| 2012/0101640 A1 * | 4/2012 | Stapelfeldt | 700/287 |
| 2012/0104754 A1 * | 5/2012 | Rudolf et al. | 290/44 |

FOREIGN PATENT DOCUMENTS

| | | | |
|---|---|---|---|
| JP | 2004301094 A | | 10/2004 |
| JP | 2007506887 | | 3/2007 |
| JP | 2007107410 A | | 4/2007 |
| KR | 10-2006-0101557 A | | 9/2006 |
| TW | 200916652 | | 4/2009 |
| TW | 200920938 | | 5/2009 |

OTHER PUBLICATIONS

Taiwanese Notice of Allowance issued Jun. 26, 2012, for Taiwan Patent Application No. 098120454—English Language Version.

Notice of Allowance issued Aug. 22, 2012 in Korean Application No. 10-2010-7020014.

Japanese Office Action for JP2009550121, dated May 22, 2012.

Decision to Grant a Patent issued Jul. 25, 2013 corresponds to Chinese patent application No. 200980110547.4.

Notice of Allowance, issued Nov. 14, 2013 corresponds to Canadian Patent Application No. 2714855.

* cited by examiner

1 ; WIND TURBINE GENERATING SYSTEM

2 ; WIND TURBINE GENERATOR
4 ; ROTOR HEAD
5 ; WIND TURBINE BLADE
6 ; NACELLE
7 ; TOWER

WIND TURBINE GENERATOR FOR USE IN COLD WEATHER, METHOD OF CONTROLLING THE SAME, AND WIND TURBINE GENERATING SYSTEM FOR USE IN COLD WEATHER

CROSS-REFERENCE TO RELATED APPLICATIONS

The present application is based on International Application No. PCT/JP2009/060322, filed Jun. 5, 2009, and priority is hereby claimed under 35 USC §119 based on this application. This application is hereby incorporated by reference in its entirety into the present application.

TECHNICAL FIELD

The present invention relates to a wind turbine generator, a method of controlling the same, and a wind turbine generating system.

BACKGROUND ART

Conventionally, there is known a wind turbine generator for generating power by using wind power as natural energy. In some cases, such a wind turbine generator is installed in a cold weather where the outside air temperature is as low as −40° C. In such a Cold weather, as the outside air temperature decreases, accordingly decreased are the temperatures of electric devices provided in a nacelle of the wind turbine generator. As a countermeasure, there is proposed a method of maintaining the electric devices in the nacelle at a predetermined temperature by using a heater or the like, thereby compensating the operations.
Patent Citation 1: Japanese Unexamined Patent Application, Publication No. 2003-288832

DISCLOSURE OF INVENTION

However, hitherto, in such a cold weather, even when a heater or the like is operating, as the outside air temperature decreases, the temperatures of electric devices sometimes decrease to a temperature (for example, −25 degrees) out of the warranty of manufacturers thereof.

In such a case, for example, when power outage occurs and thereafter a utility grid recovers from the power outage state, in spite of the fact that the ambient temperature of the electric devices becomes the temperature out of the warranty of the manufacturers, power from the utility grid side is supplied to the electric devices in the wind turbine generator. Accordingly, there is caused a problem that the electric devices are damaged. Since the electric devices are damaged, there occurs another problem that the operation rate of the wind turbine generator decreases.

The present invention has been achieved to solve the above problem, and an object thereof is to provide a wind turbine generator that prevents a damage on electric devices when installed in a cold weather, a method of controlling the same, and a wind turbine generating system.

To achieve the above object, the present invention employs the following units.

A first mode of the present invention relates to a wind turbine generator including: a power supply unit connected to a utility grid via a switch gear; a utility grid voltage measuring unit provided between the power supply unit and the utility grid, for measuring a voltage of the utility grid; and a temperature measuring unit for obtaining an ambient temperature of the power supply unit, wherein in a case where a measurement value of the temperature measuring unit or an ambient temperature of the power supply unit estimated based on the measurement value is smaller than a first temperature threshold determined based on a function guarantee temperature of the power supply unit and the voltage measured by the utility grid voltage measuring unit is smaller than a preset voltage threshold, the switch gear operates to interrupt the connection between the power supply unit and the utility grid.

With such a configuration, in the state where the power supply unit is connected to the utility grid via the switch gear, in the case where the measurement value of the temperature measuring unit or the ambient temperature of the power supply unit estimated based on the measurement value is smaller than the first temperature threshold determined based on the function guarantee temperature of the power supply unit and the voltage of the utility grid measured by the utility grid voltage measuring unit provided between the power supply unit and the utility grid is smaller than the voltage threshold, the switch gear operates to interrupt the connection between the power supply unit and the utility grid.

With the configuration, in the case where the voltage of the utility grid drops due to occurrence of power outage or the like in a state where the temperature of the power supply unit is equal to or lower than the function guarantee temperature of the power supply unit, the power supply unit can be disconnected from the utility grid. As a result, in such a state where the power supply unit is equal to or lower than the function guarantee temperature, voltage application to the power supply unit caused by recovery of the utility grid can be prevented, and a damage on the power supply unit caused by voltage application at a temperature out of the function guarantee temperature can be prevented.

In a case where the measurement value of the temperature measuring unit or the ambient temperature of the power supply unit is equal to or higher than a second temperature threshold determined based on the function guarantee temperature of the power supply unit in a state where the connection between the power supply unit and the utility grid is interrupted, the power supply unit and the utility grid may be connected to each other.

Consequently, the power supply unit and the utility grid can be connected to each other in a state where the temperature of the power supply unit is within the function guarantee temperature.

In the wind turbine generator, the power supply unit may be provided in a nacelle, and the temperature measuring unit may be provided in the nacelle.

With the configuration, as compared with a case where the temperature measuring unit is provided outside the nacelle, the ambient temperature of the power supply unit can be measured with higher precision. In particular, in a case where the temperature measuring unit is attached to the power supply unit, the temperature of the power supply unit itself can be measured. Therefore, the apparatus can be used to a limit temperature at which the power supply unit can be used.

In the wind turbine generator, the power supply unit may be provided in a nacelle, the temperature measuring unit may be provided in an outer periphery of the nacelle, and the ambient temperature of the power supply unit may be estimated based on the measurement value of the temperature measuring unit.

For example, in a case where there is a temperature measuring device provided for another purpose in the outer periphery of the nacelle, the ambient temperature of the power supply unit is estimated based a value measured by the temperature measuring device. In such a manner, without mounting a new device, the ambient temperature of the power supply unit can be obtained.

In the wind turbine generator, the power supply unit may be provided in a nacelle, the temperature measuring unit may be provided in an outer periphery of the nacelle, and when a state where the measurement value of the temperature measuring unit is smaller than the first temperature threshold and the voltage measured by the utility grid voltage measuring unit is smaller than the preset voltage threshold is maintained for a predetermined period, the power supply unit may be disconnected from the utility grid.

In a state where power is supplied from the utility grid to the power supply unit, the warm-up operation is performed by a heater disposed in the nacelle, so that a difference in temperature difference is generated between the ambient temperature of the power supply unit and the measurement value of the temperature measuring unit disposed outside the nacelle. Even in such a case, when power supply to the power supply unit is interrupted due to occurrence of power outrage or the like, the operation of the heater stops and the temperature in the nacelle, in other words, the ambient temperature of the power supply unit, gradually decreases to the outside air temperature.

Therefore, by determining whether or not a predetermined period has elapsed after occurrence of power outage, in other words, whether or not a predetermined period has elapsed since the voltage measured by the utility grid voltage measuring unit becomes lower than the voltage threshold, the power supply unit and the utility grid can be disconnected from each other in a state where the ambient temperature of the power supply unit becomes almost the same value as the first temperature threshold.

The wind turbine generator may further include an electric storage device for supplying power to the switch gear in a state where the connection between the utility grid and the power supply unit is interrupted, and the predetermined period may be set based on a remaining capacity of the electric storage device.

For example, in a case where power outage or the like occurs in the utility grid and power supply from the utility grid to the switch gear is interrupted, power is supplied from the electric storage device to other devices, and the control of opening/closing the switch gear is performed. Therefore, before the remaining capacity of the electric storage device drops below the charge amount necessary to perform control of opening/closing the switch gear, determination to set the switch gear to the open state has to be made. Therefore, by setting the predetermined period based on the remaining capacity of the electric storage device as described above, an instruction to open the switch gear is outputted while the charge amount for controlling the switch gear is secured in the electric storage device. Consequently, by power supply from the electric storage device, the connection between the power supply unit and the utility grid can be reliably interrupted.

A second mode of the present invention relates to a wind turbine generating system including: any one of the wind turbine generator described above; and a switch gear for switching between connection and disconnection of the wind turbine generator and a utility grid.

With such a configuration, the switch gear for switching between connection and disconnection of the wind turbine generator having the power supply unit and the utility grid is provided. In the case where the measurement value of the temperature measuring unit or the ambient temperature of the power supply unit estimated based on the measurement value is smaller than the first temperature threshold and the voltage of the utility grid measured by the utility grid voltage measuring unit provided between the power supply unit and the utility grid is smaller than the voltage threshold, the switch gear operates to interrupt the connection between the wind turbine generator and the utility grid.

Consequently, in the case where the voltage of the utility grid drops due to occurrence of power outage or the like in the state where the temperature of the power supply unit is equal to or lower than the function guarantee temperature of the power supply unit, the power supply unit can be disconnected from the utility grid. As a result, for example, in a state where the power supply unit is equal to or lower than the function guarantee temperature, voltage application to the power supply unit caused by recovery of the utility grid can be prevented, and a damage on the power supply unit caused by voltage application at a temperature out of the function guarantee temperature can be prevented.

A third mode of the present invention relates to a method of controlling a wind turbine generator, including the steps of: measuring a voltage of the utility grid between the power supply unit and the utility grid; obtaining an ambient temperature of the power supply unit; and in a case where a measurement value of the ambient temperature of the power supply unit or an ambient temperature of the power supply unit estimated based on the measurement value is smaller than a first temperature threshold determined based on a function guarantee temperature of the power supply unit and the voltage of the utility grid is smaller than a predetermined voltage threshold, interrupting connection between the power supply unit and the utility grid.

According to such a control method, in the case where the measurement value of the ambient temperature of the power supply unit or the ambient temperature of the power supply unit estimated based on the measurement value is smaller than the first temperature threshold and the voltage of the utility grid is smaller than the voltage threshold, the connection between the power supply unit and the utility grid is interrupted.

Accordingly, in a case where the voltage of the utility grid drops due to occurrence of power outage or the like in a state where the temperature of the power supply unit is equal to or lower than the function guarantee temperature of the power supply unit, the power supply unit can be disconnected from the utility grid. As a result, for example, in the state where the temperature of the power supply unit is equal to or less than the function guarantee temperature, voltage application to the power supply unit caused by recovery of the utility grid can be prevented, and a damage on the power supply unit caused by voltage application at a temperature out of the function guarantee temperature can be prevented.

According to the present invention, there is exerted an effect that a damage on electric devices is prevented in a wind turbine generator installed in a cold weather.

EXPLANATION OF REFERENCE

Figure 1:
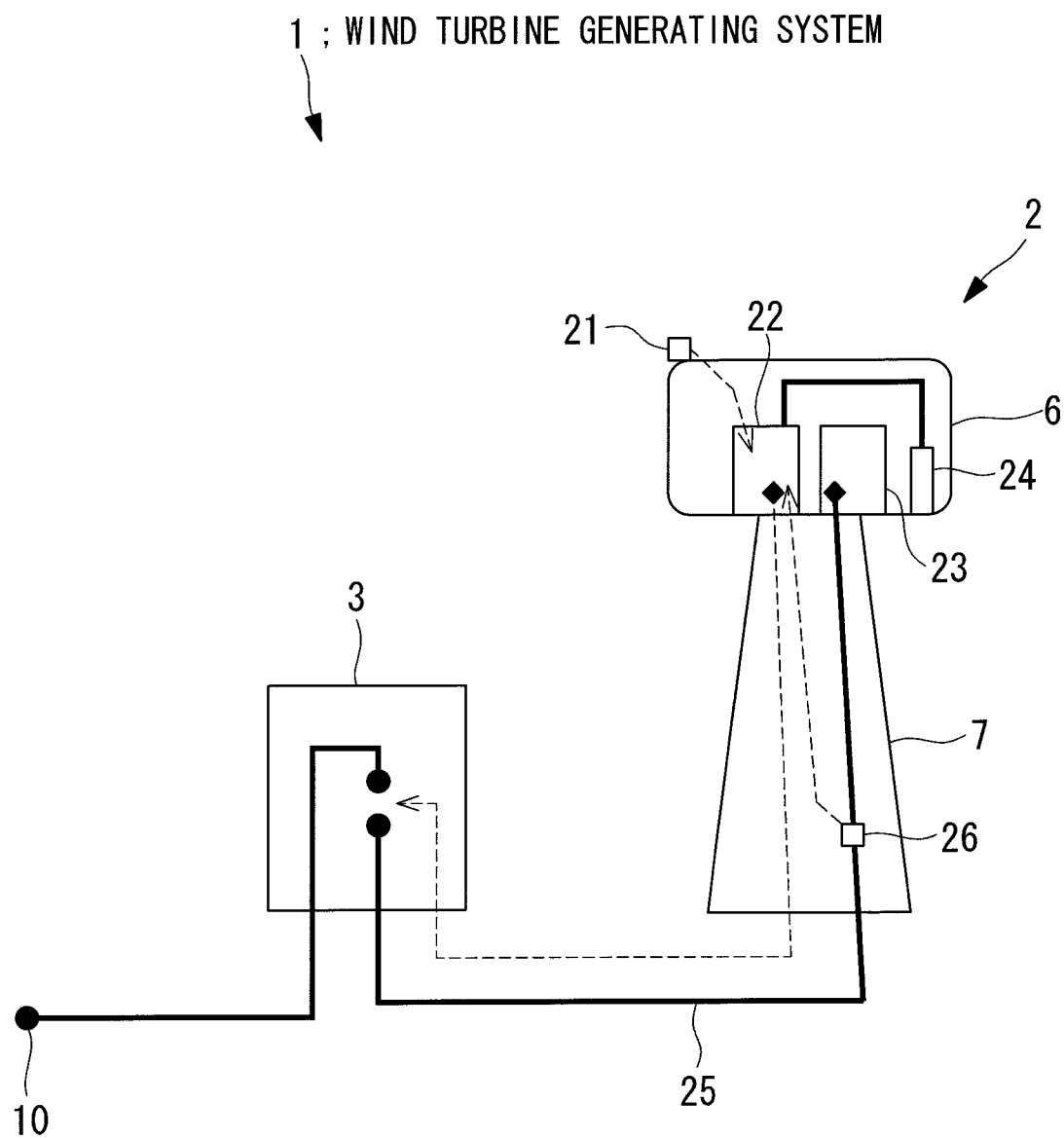
FIG. 1 Diagram showing an example of a configuration of an entire wind turbine generating system according to an embodiment of the present invention.

1: wind turbine generating system
2: wind turbine generator
3: switch gear
21: temperature measuring unit
22: control unit
23: power supply unit
24: electric storage device
25: power supply line
26: utility grid voltage measuring unit

BEST MODE FOR CARRYING OUT THE INVENTION

Embodiments of a wind turbine generator, a method of controlling the same, and a wind turbine generating system according to the present invention will be described below with reference to the drawings.

First Embodiment

FIG. 1 is a diagram showing a configuration of an entire wind turbine generating system 1 according to a first embodiment of the present invention. The wind turbine generating system 1 includes a wind turbine generator 2 and a switch gear 3. The wind turbine generator 2 is connected to the switch gear 3 via a power supply line 25, and further, the switch gear 3 and a utility grid 10 are connected to each other via a not-shown transformer.

The switch gear 3 switches between connection and disconnection of the wind turbine generator 2 and the utility grid 10. In a case where the switch gear 3 is in a close state, the wind turbine generator 2 and the utility grid 10 are in a connection state. In an open state, the wind turbine generator 2 and the utility grid 10 are in a non-connection state.

Figure 2:
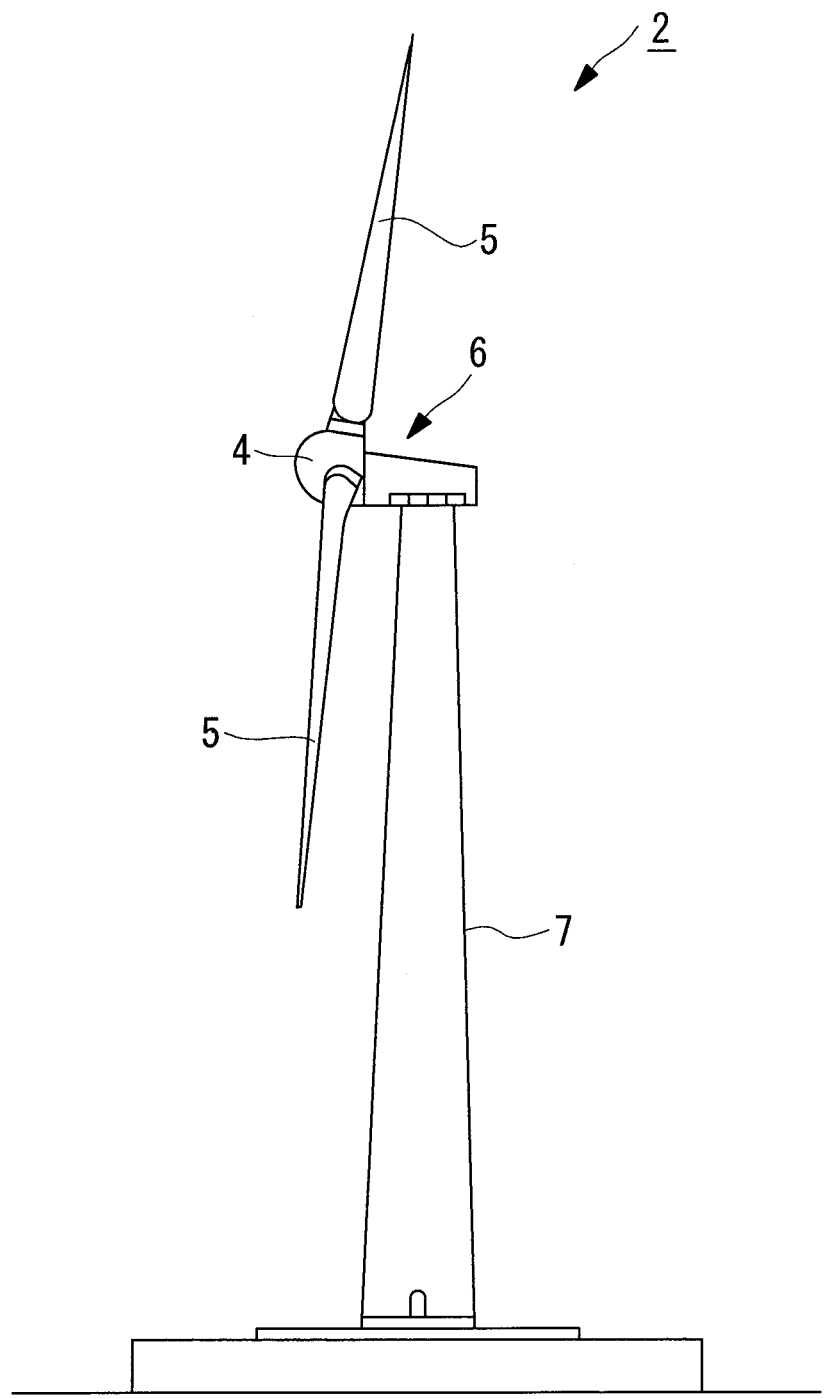
FIG. 2 Diagram showing a schematic configuration of a wind turbine generator according to an embodiment of the present invention.

FIG. 2 is a diagram showing a schematic configuration of the wind turbine generator 2 according to the present embodiment.

The wind turbine generator 2 includes, as shown in FIG. 2, a tower 7, a nacelle 6 mounted on the upper end of the tower 7, and a rotor head 4 provided to the nacelle 6 so as to be rotatable about an almost horizontal axis. To the rotor head 4, three wind turbine blades 5 are radially attached about the rotational axis of the rotor head 4. With the configuration, the force of wind hitting the wind turbine blade 5 from the rotational axis direction of the rotor head 4 is converted to power for rotating the rotor head 4 about the rotational axis, and this power is converted to electric energy by a generator.

As shown in FIG. 1, the wind turbine generator 2 includes a temperature measuring unit 21 in the outer periphery of the nacelle 6, and further includes a control unit 22, a power supply unit 23, and an electric storage device 24 in the nacelle 6. The power supply unit 23 and the switch gear 3 are connected to each other via a power supply line 25, and a utility grid voltage measuring unit 26 is provided on the path of the power supply line 25 in the tower 7.

The temperature measuring unit 21 measures the temperature in the attachment position to obtain an ambient temperature of the power supply unit 23. Concretely, the temperature measuring unit 21 is attached to the outer periphery of the nacelle 6, measures the outside air temperature in the attachment position, and outputs the measured outside air temperature to the control unit 22. The outside air temperature measured by the temperature measuring unit 21 is used by the control unit 22 to estimate the ambient temperature of the power supply unit 23.

As the temperature measuring unit 21, an apparatus for measuring a temperature mounted on the outer periphery of the nacelle for another purpose may be used in an existing wind turbine generator, or a temperature measuring unit may be newly provided.

To the electric storage device 24, there are supplied electric power generated by power that is produced by rotation of the rotor head 4 and electric power from the utility grid 10.

In a case where sufficient electric power is not supplied to the control unit 22 and other auxiliary devices (for example, an electromagnetic relay) due to occurrence of power outage or the like, the electric storage device 24 supplies power to these devices. Concretely, the electric power of the electric storage device 24 is used to turn on a switch lamp provided to the switch gear 3 and is used as a drive power to an electromagnetic relay for opening/closing the switch gear 3.

The utility grid voltage measuring unit 26 detects a voltage on the utility grid 10 side on the path of the power supply line 25 and outputs the result to the control unit 22.

The power supply unit 23 supplies power obtained by power generation to the utility grid 10 and the devices in the nacelle 6. From the utility grid 10, the power is supplied to the power supply unit 23 via the power supply line 25.

The control unit 22 determines an "open (open state)" or "close (close state)" instruction signal to be transmitted to the switch gear 3 based on measurement results obtained from the temperature measuring unit 21 and the utility grid voltage measuring unit 26, and transmits the instruction signal to the switch gear 3. In such a manner, the control unit 22 can control the switch gear 3 based on the measurement results of the temperature measuring unit 21 and the utility grid voltage measuring unit 26.

The operations of the wind turbine generator 2 having the above-described configuration will be described below. The processes executed by the control unit 22 in a case where the switch gear 3 is in the close state and those in a case where the switch gear 3 is in the open state are different from each other. Therefore, in the following description, the operations in the case where the switch gear 3 is in the close state and those in the case where the switch gear 3 is in the open state will be described separately from each other.

Operation Flow when Switch Gear 3 is in Close State

Since the position where the temperature measuring unit 21 is provided and the position where the power supply unit 23 is provided are different from each other, the ambient temperature of the power supply unit 23 provided in the nacelle 6 is estimated from the outside air temperature measured by the temperature measuring unit 21 that is provided in the outer periphery of the nacelle 6. For example, when the temperature of the power supply unit 23 is set to be regarded as being higher than the outside air temperature by +5 degrees, the control unit 22 adds +5 degrees to the outside air temperature measured by the temperature measuring unit 21, thereby estimating the ambient temperature of the power supply unit 23.

Subsequently, the control unit 22 determines whether or not the estimated ambient temperature of the power supply unit 23 is smaller than a first temperature threshold determined based on a function guarantee temperature of the power supply unit 23. The first temperature threshold may be set to, for example, the function guarantee temperature or to a value obtained by adding some margin to the function guarantee temperature. This value can be arbitrarily set based on the function guarantee temperature. As a result, when the estimated ambient temperature of the power supply unit 23 is smaller than the first temperature threshold, subsequently determined is whether or not the voltage on the utility grid 10 side obtained from the utility grid voltage measuring unit 26 is smaller than the voltage threshold. By making such determination, whether power outage occurs in the utility grid 10 or not is determined.

As a result, in a case where the voltage of the utility grid 10 is determined to be smaller than the voltage threshold, the control unit 22 transmits an "open" instruction signal to the switch gear 3 so as to set the switch gear 3 to the open state.

Control to open the switch gear 3 may be automatically performed by, for example, power supply from the electric storage device 24 disposed in the nacelle 6. Alternatively, a site worker may go to a site and manually set the switch gear 3 to the open state.

As described above, in the case where the estimated ambient temperature of the power supply unit 23 is smaller than the first temperature threshold and the voltage of the utility grid 10 is smaller than the voltage threshold, by disconnecting the power supply unit 23 from the utility grid 10, voltage application to the power supply unit 23 due to recovery of the utility grid 10 can be prevented when the temperature of the power supply unit 23 is equal to or less than the function guarantee temperature. As a result, prevented is a damage on the power supply unit 23 caused by voltage application at a temperature out of the function guarantee temperature.

In a case where the period of power outage is short (for example, for a few seconds or a few minutes), the influence of power recovery on the power supply unit 23 is small. The switch gear 3 may thus be set to the open state in such a case where the power outage state is maintained for a predetermined period. With this arrangement, control to open/close the switch gear 3 can be prevented from being performed frequently due to temporal power drop or the like, so that control to open/close the switch gear 3 can be made stable.

Operation Flow when Switch Gear 3 is in Open State

The control unit estimates the ambient temperature of the power supply unit 23 from the outside air temperature measured by the temperature measuring unit 21, and determines whether or not the estimated ambient temperature of the power supply unit 23 is equal to or higher than a second temperature threshold determined from the function guarantee temperature of the power supply unit 23. The second temperature threshold is a temperature value for determining that the temperature of the power supply unit 23 is equal to or higher than the function guarantee temperature and, for example, is set to the value same as or larger than the first temperature threshold described above. As a result, when the estimated ambient temperature of the power supply unit 23 is equal to or higher than the second temperature threshold, the control unit 22 outputs a "close" instruction so as to set the switch gear 3 to the close state. By this instruction, the switch gear 3 is changed from the open state to the close state and the power supply unit 23 and the utility grid 10 are connected to each other.

Thus, in the case where the estimated ambient temperature of the power supply unit 23 is equal to or higher than the second temperature threshold, the switch gear 3 is set to the close state, so that the power supply unit 23 and the utility grid 10 can be reliably connected to each other in a state where the temperature of the power supply unit 23 is within the function guarantee temperature.

As described above, in the wind turbine generator 2, the method of controlling the same, and the wind turbine generating system 1 according to the present embodiment, when the temperature of the power supply unit 23 is equal to or less than the function guarantee temperature, prevented is voltage application to the power supply unit 23 caused by recovery of the utility grid 10 from power outage. As a result, prevented is a damage on the power supply unit 23 caused by voltage application at a temperature out of the function guarantee temperature.

Further, since the switch gear 3 is set to the close state in a state where the estimated ambient temperature of the power supply unit 23 is equal to or higher than the second temperature threshold, the power supply unit 23 and the utility grid 10 can be reliably connected to each other in a state where the temperature of the power supply unit 23 is within the function guarantee temperature.

In the first embodiment, by adding a predetermined temperature (for example, five degrees) to a measurement value of the temperature measuring unit 21 mounted in the outer periphery of the nacelle 6, the ambient temperature of the power supply unit 23 is estimated. However, the method of estimating the ambient temperature of the power supply unit 23 from the outside air temperature is not limited to the above-described method.

For example, in a case where the ambient temperature of the power supply unit 23 is influenced not only by the outside air temperature but also by other factors such as heat from a heater for warming air disposed in the nacelle 6, the ambient temperature of the power supply unit 23 may be estimated from the outside air temperature by using a predetermined arithmetic expression including a parameter related to the heater. In such a manner, precision of estimating the ambient temperature of the power supply unit 23 can be improved.

Alternatively, the temperature measuring unit 21 may be mounted in the nacelle 6. With this configuration, the temperature of the power supply unit 23 can be measured more precisely as compared with the case of attaching the temperature measuring unit 21 in the outer periphery of the nacelle 6. This configuration can deal with a case where the relation between the outside air temperature and the temperature in the nacelle 6 varies.

Further alternatively, the temperature measuring unit 21 may be attached to the power supply unit 23. With this configuration, the temperature of the power supply unit 23 itself can be measured, so that the first temperature threshold can be set to the temperature of a limit of a permissible range in which the function of the power supply unit 23 is guaranteed (for example, the minimum temperature of the function guarantee). As a result, the power supply unit 23 can be used to the limit of the temperature of the function guarantee.

Second Embodiment

Described next are a wind turbine generator 2, a method of controlling the same, and a wind turbine generating system according to a second embodiment of the present invention.

The wind turbine generating system 1 according to the present embodiment has a configuration similar to that of the foregoing first embodiment but there are differences in a method and processes of determining control to open/close the switch gear 3 by the control unit 22. Concretely, in the foregoing first embodiment; the ambient temperature of the power supply unit 23 is estimated from the outside air temperature, and the estimated ambient temperature and the first temperature threshold are compared with each other. In the present embodiment, by comparing the outside air temperature directly with the first temperature threshold, open/close control of the switch gear 3 is determined.

In the following, processes of determining the open/close state of the switch gear 3 to be executed by the control unit 22 will be described with reference to FIGS. 3 and 4.

Operation Flow when Switch Gear 3 is in Close State

Figure 3:
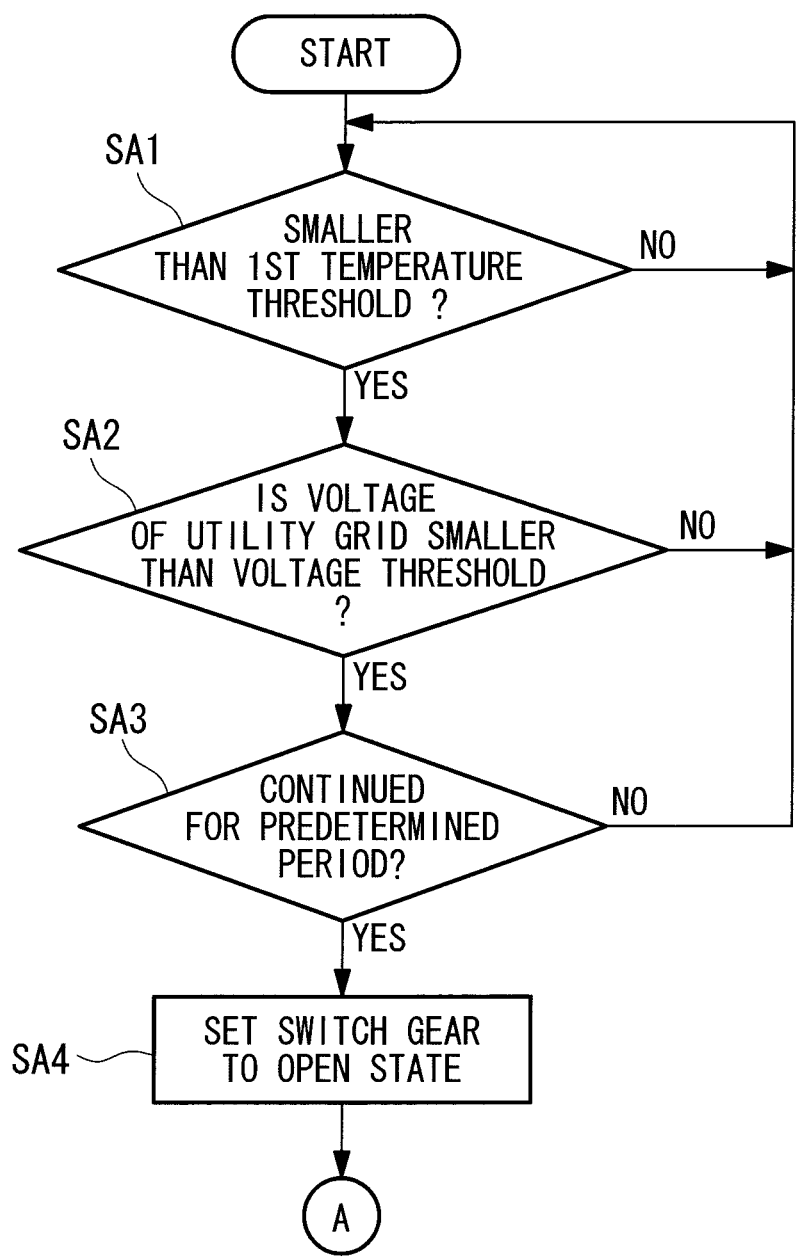
FIG. 3 Operation flow in a case where a wind turbine generator and a utility grid are disconnected from each other.

The control unit 22 determines whether or not the outside air temperature measured by the temperature measuring unit 21 that is provided in the outer periphery of the nacelle 6 is smaller than a first temperature threshold determined based on the function guarantee temperature of the power supply unit 23 (step SA1 in FIG. 3).

In a case where the outside air temperature measured by the temperature measuring unit 21 is smaller than the first temperature threshold as a result ("YES" in step SA1 in FIG. 3), subsequently determined is whether or not the voltage of the utility grid 10 obtained from the utility grid voltage measuring unit 26 is smaller than the voltage threshold (step SA2 in FIG. 3). By the operation, determined is whether or not power outage occurs.

In a case where the voltage of the utility grid 10 is determined to be smaller than the voltage threshold as a result, the control unit 22 determines whether or not a state where the outside air temperature is smaller than the first temperature threshold and the voltage of the utility grid 10 is smaller than the voltage threshold is maintained for a predetermined period.

The meaning of determining whether the state is maintained for a predetermined period or not will be described.

In the present embodiment, the ambient temperature of the power supply unit 23 is not estimated from the outside air temperature as in the first embodiment. However, when a state where the outside air temperature is lower than the first temperature threshold lasts for a predetermined period, it is regarded that the outside air temperature and the ambient temperature of the power supply unit 23 coincide with each other.

Usually, when the outside air temperature is equal to or less than a predetermined value, the heater or the like in the nacelle 6 operates to warm air. By the operation, temperature decrease in the power supply unit 23 can be suppressed. However, when power supply to the heater is interrupted due to, for example, occurrence of power outage, the temperature of the power supply unit 23 gradually decreases to reach in the end the outside air temperature.

Therefore, in the present embodiment, when a state where the heater does not operate, that is, a state where the voltage of the utility grid 10 is smaller than the power threshold lasts for a predetermined period, the ambient temperature of the power supply unit 23 and the outside air temperature are regarded as the same value, and the ambient temperature of the power supply unit 23 is determined to be smaller than the first temperature threshold. Consequently, the predetermined period can be expressed as, for example, time required for the decreasing ambient temperature of the power supply unit 23 to reach the outside air temperature.

When, as a result of the step SA3, the state where the outside air temperature is smaller than the first temperature threshold and the voltage of the utility grid 10 is smaller than the voltage threshold is determined to be maintained for a predetermined period, the control unit 22 transmits an "open" instruction signal to the switch gear 3 so as to set the switch gear 3 to the open state (step SA4). In a case where any of the conditions is not satisfied in the steps SA1 to SA3, the program returns to the step SA1 and determination described above is performed repeatedly at predetermined intervals.

Operation Flow when Switch Gear 3 is in Open State

The control unit 22 determines whether or not the outside air temperature measured by the temperature measuring unit 21 is equal to or higher than a second temperature threshold that is determined based on the function guarantee temperature of the power supply unit 23. Since air warming by the heater has been already stopped at this time, the outside air temperature and the temperature of the power supply unit 23 can be dealt as the same value. Therefore, with the outside air temperature being regarded as the ambient temperature of the power supply unit 23, the determining process can be continued.

In a case where the outside air temperature is equal to or higher than the second temperature threshold in step SB1, the control unit 22 outputs an "close" instruction to set the switch gear 3 to the close state. By the instruction, the switch gear 3 is changed from the open state to the close state, and the power supply unit 23 and the utility grid 10 are connected to each other.

As described above, in the wind turbine generator 2, the method of controlling the same, and the wind turbine generating system 1 according to the present embodiment, the ambient temperature of the power supply unit 23 is not estimated but the outside air temperature measured by the temperature measuring unit 21 mounted in the outer periphery of the nacelle 6 is used as it is and control to open/close the switch gear 3 is performed. By the control, an effect similar to that of the first embodiment can be exerted and the process of estimating the ambient temperature of the power supply unit 23 can be made unnecessary.

As described above, in the present embodiment, after the power outage state is maintained for a predetermined period, the outside air temperature and the ambient temperature of the power supply unit 23 are regarded as the same value. Alternatively, without waiting for lapse of the predetermined period, that is, with the ambient temperature being regarded as the ambient temperature of the power supply unit 23, the switch gear 3 may be set to the open state when the ambient temperature is less than the first temperature threshold and the utility grid voltage is less than the voltage threshold. In the case where the outside air temperature is regarded as the ambient temperature of the power supply unit 23 as described above, the difference in temperature is higher than that in the above example. Even in such a case, the temperature of the power supply unit 23 hardly drops below the outside air temperature, so that voltage application at a temperature equal to or lower than the function guarantee temperature of the power supply unit 23 can be still prevented.

The switch gear 3 may be manually opened/closed by a site worker or may be automatically opened/closed by power supply from the electric storage device 24 disposed in the nacelle 6. In the case of automatically controlling the switch gear 3 by power supply from the electric storage device 24, the power necessary to open/close the switch gear 3 has to be stored in the electric storage device 24. That is, in the present embodiment, in a state where power outage occurs and power supply from the utility grid 10 is interrupted, power is supplied from the electric storage device 24 to the switch gear 3. Consequently, the remaining capacity of the electric storage device 24 rapidly decreases after occurrence of power outage (refer to, for example, time $t_3$ to $t_4$ in FIG. 5).

Therefore, for example, when the period from occurrence of power outage to the switch gear 3 being set to the open state takes long, after lapse of the period, the remaining capacity of the electric storage device 24 possibly drops to or below the minimum remaining capacity necessary to operate the switch gear 3. For such a reason, in the case of automatically controlling opening/closing of the switch gear 3 by power supply from the electric storage device 24, a predetermined period in the step SA3 in FIG. 3 is preferably determined based on the remaining capacity of the electric storage device 24.

The operations of the wind turbine generator 2 according to the second embodiment of the present invention will be described by a concrete example with reference to FIGS. 3 to 5. FIG. 5 is a diagram showing an outside air temperature measured by the temperature measuring unit 21 and a change in the state of devices operating in relation to the outside air temperature. The present embodiment refers to a case where the first temperature threshold is set to −30 degrees and the second temperature threshold is set to −25 degrees. Further, referred herein is a case where control of setting the switch gear 3 to the open state is performed by power supply from the electric storage device 24 and control to set the switch gear 3 to the close state is performed manually by a site worker.

First, when the temperature decreases gradually from time $t_1$ in FIG. 5 and reaches, for example, −25 degrees, the operation of a generator is stopped. When the temperature further decreases and the outside air temperature becomes below −30 degrees at time $t_2$, the control unit 22 determines "YES" in the process of step SA1 in FIG. 3. Further, when the outside air temperature becomes equal to or less than a predetermined temperature, the heater in the nacelle 6 operates to warm air in the nacelle 6.

Subsequently, the temperature further decreases from time $t_2$ to time $t_3$. When power outage or the like occurs in the utility grid 10 at time $t_3$ and the voltage of the utility grid 10 becomes smaller than the voltage threshold (for example, 0 volt), the control unit 22 determines "YES" in the process of step SA2 in FIG. 3. By the occurrence of power outage or the like, power supply to the heater is interrupted. Further, since power supply from the utility grid 10 to the switch gear 3 is also interrupted due to the occurrence of power outage or the like, power is supplied to the switch gear 3 from the electric storage device 24 that is provided as an alternate power supply. Consequently, the remaining capacity of the electric storage device 24 decreases with time.

Thereafter, when it is determined at time $t_4$ that a state where the outside air temperature is lower than a predetermined temperature and the voltage of the utility grid 10 is less than the voltage threshold is maintained for a predetermined period, the control unit 22 determines "YES" in the process of step SA3 in FIG. 3, and outputs to the switch gear 3 an "open" instruction signal for setting the switch gear 3 to the open state. The predetermined period is set in a range in which the remaining capacity of the electric storage device 24 is not equal to or less than a remaining capacity corresponding to power necessary to control to open/close the switch gear 3.

When obtaining an "open" instruction signal, the switch gear 3 receives power supply from the electric storage device 24 to be in the open state. When the switch gear 3 is in the open state and power supply to the switch gear 3 becomes unnecessary, discharge to the switch gear 3 is stopped and the electric storage device 24 is brought in a natural discharge state.

Figure 4:
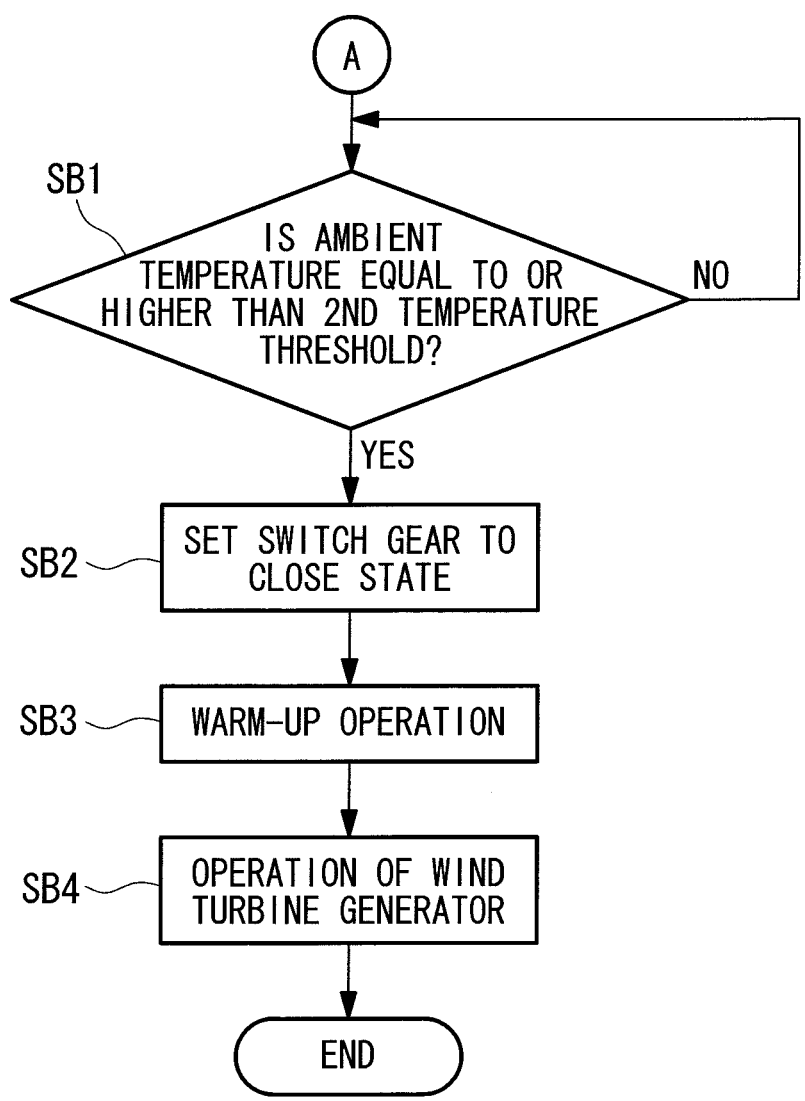
FIG. 4 Operation flow in a case where the wind turbine generator and the utility grid are connected to each other.
Figure 5:
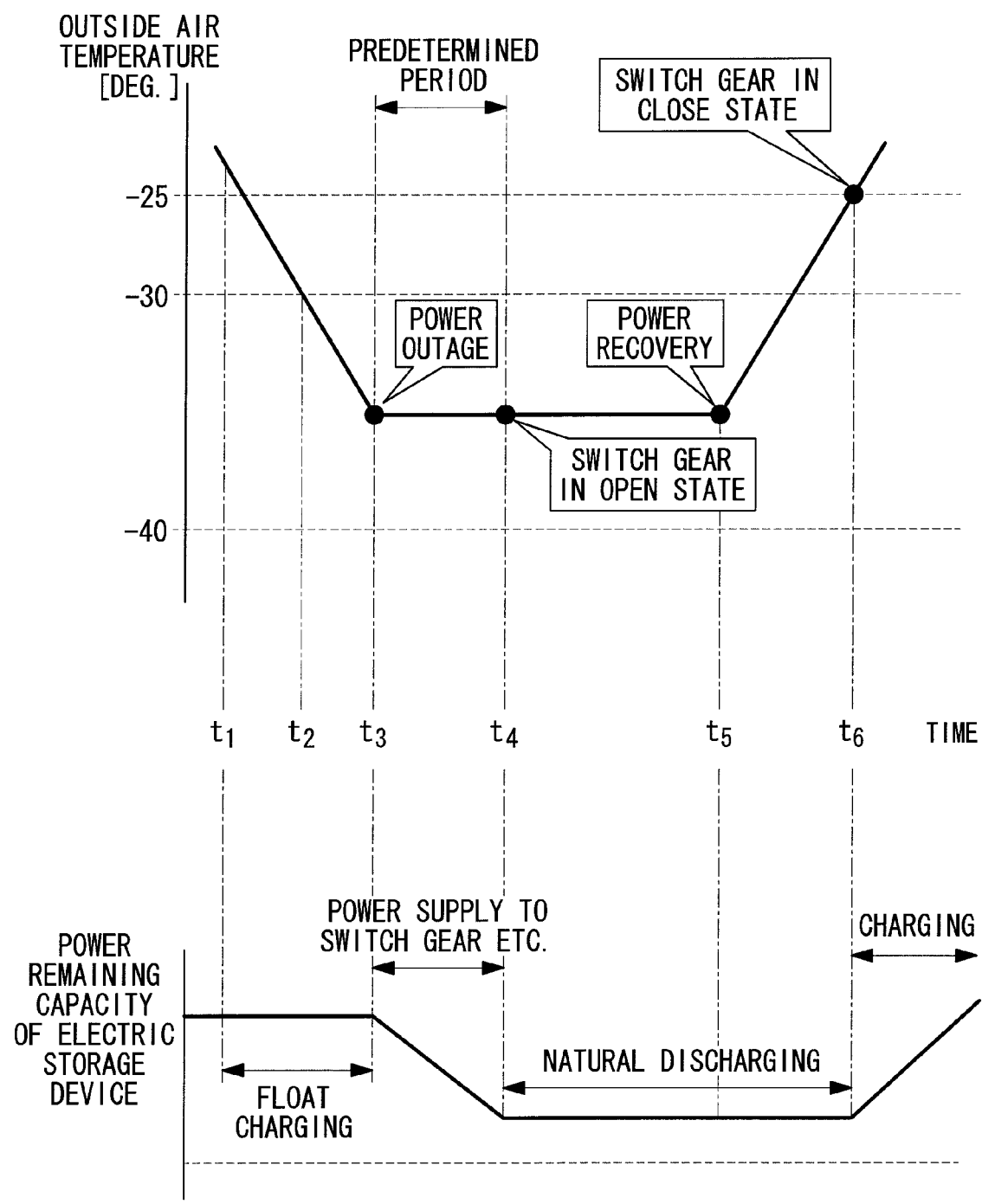
FIG. 5 Diagram for explaining an outside air temperature measured around the outer periphery of a nacelle, an open/close state of a switch gear, and a state of an electric storage device.

When the utility grid 10 recovers at time $t_5$ in FIG. 5 in this state and the outside air temperature starts rising and becomes −25 degrees or more at time $t_6$, the control unit 22 determines "YES" in step SB1 in FIG. 4, and outputs to the switch gear 3 a "close" instruction signal so as to set the switch gear 3 to the close state. By the signal, the switch gear 3 is brought in the close state, and the power unit 23 and the utility grid 10 are connected to each other.

When power supply from the utility grid 10 is restarted, the heater in the nacelle 6 operates to restart a warm-up operation (step SB4 in FIG. 4). When the electric devices disposed in the nacelle 6 are warmed by the heater to reach a predetermined temperature (for example, the function guarantee temperature of each device), the operation of the wind turbine generator 2 restarts (step SB4 in FIG. 4). Consequently, power generation by the wind turbine generator 2 restarts and power thus generated is supplied also to the electric storage device 24, thereby charging the electric storage device 24.

The invention claimed is:

1. A wind turbine generating system comprising:
a switch gear for switching between connection and disconnection of the wind turbine generator and a utility grid, and
a wind turbine generator comprising:
a power supply unit connected to a utility grid via a switch gear;
a utility grid voltage measuring unit provided between the power supply unit and the utility grid, for measuring a voltage of the utility grid; and
a temperature measuring unit for obtaining an ambient temperature of the power supply unit; and
an electric storage device for supplying power to the switch gear in a state where the connection between the utility grid and the power supply unit is interrupted, wherein
in a case where a measurement value of the temperature measuring unit or an ambient temperature of the power supply unit estimated based on the measurement value is smaller than a first temperature threshold determined based on a function guarantee temperature of the power supply unit, where the voltage measured by the utility grid voltage measuring unit is smaller than a preset voltage threshold, and where a state where the voltage of the utility grid is less than the preset voltage threshold is maintained for a predetermined period, a determination that a power outage will occur is made, and the switch gear operates to interrupt the connection between the power supply unit and the utility grid, and
the predetermined period is set based on a remaining capacity of the electric storage device.

2. The wind turbine generating system according to claim 1, wherein in a case where the measurement value of the temperature measuring unit or the ambient temperature of the power supply unit is equal to or higher than a second temperature threshold determined based on the function guarantee temperature of the power supply unit in a state where the connection between the power supply unit and the utility grid is interrupted, the power supply unit and the utility grid are connected to each other.

3. The wind turbine generating system according to claim 1, wherein
the power supply unit is provided in a nacelle, and
the temperature measuring unit is provided in the nacelle.

4. The wind turbine generating system according to claim 1, wherein
the power supply unit is provided in a nacelle,
the temperature measuring unit is provided in an outer periphery of the nacelle, and
the ambient temperature of the power supply unit is estimated based on the measurement value of the temperature measuring unit.

5. The wind turbine generating system according to claim 1, wherein
the power supply unit is provided in a nacelle,
the temperature measuring unit is provided in an outer periphery of the nacelle, and
when a state where the measurement value of the temperature measuring unit is smaller than the first temperature threshold and the voltage measured by the utility grid voltage measuring unit is smaller than the preset voltage threshold is maintained for a predetermined period, the power supply unit is disconnected from the utility grid.

6. A method of controlling a wind turbine generator, comprising the steps of:

measuring a voltage of a utility grid between a power supply unit and the utility grid;

obtaining an ambient temperature of the power supply unit; and in a case where a measurement value of the ambient temperature of the power supply unit or an ambient temperature of the power supply unit estimated based on the measurement value is smaller than a first temperature threshold determined based on a function guarantee temperature of the power supply unit, where the voltage of the utility grid is smaller than a predetermined voltage threshold, and where a state where the voltage of the utility grid is less than the predetermined voltage threshold is maintained for a predetermined period, determining that a power outage will occur, and interrupting connection between the power supply unit and the utility grid via a switch gear, the predetermined period is set based on a remaining capacity of the electric storage device for supplying power to the switch gear in a state where the connection between the utility grid and the power supply unit is interrupted.

7. The method of controlling a wind turbine generator according to claim 6, wherein the first temperature threshold is a value obtained by adding some margin to the function guarantee temperature.

* * * * *